US010937555B2

(12) United States Patent
El Kabali et al.

(10) Patent No.: US 10,937,555 B2
(45) Date of Patent: Mar. 2, 2021

(54) NUCLEAR POWER PLANT

(71) Applicant: CAVERION Deutschland GmbH, Munich (DE)

(72) Inventors: Chafik El Kabali, Aachen (DE); Hans Felser, Aachen (DE); Peter Hausch, Dresden (DE); Claus Schweinheim, Cologne (DE)

(73) Assignee: CAVERION Deutschland GmbH, Munich (DE)

( * ) Notice: Subject to any disclaimer, the term of this patent is extended or adjusted under 35 U.S.C. 154(b) by 1635 days.

(21) Appl. No.: 14/607,760

(22) Filed: Jan. 28, 2015

(65) Prior Publication Data
US 2016/0189809 A1    Jun. 30, 2016

(30) Foreign Application Priority Data
Dec. 19, 2014   (DE) .......................... 10 2014 018 810

(51) Int. Cl.
*G21C 13/02*   (2006.01)
*G21C 9/004*   (2006.01)
*G21F 9/02*    (2006.01)

(52) U.S. Cl.
CPC ............ *G21C 13/022* (2013.01); *G21C 9/004* (2013.01); *G21F 9/02* (2013.01); *Y02E 30/40* (2013.01)

(58) Field of Classification Search
CPC .......... G21C 9/004; G21C 9/303; G21C 9/02; G21C 3/02; G21C 13/022; G21F 9/02
USPC ....................................................... 376/283
See application file for complete search history.

(56) References Cited

U.S. PATENT DOCUMENTS

| | | | | | |
|---|---|---|---|---|---|
| 3,925,046 | A | * | 12/1975 | Hickey | ................... B01D 53/02 96/121 |
| 5,078,960 | A | * | 1/1992 | Berg | ..................... G21C 9/004 376/314 |
| 2014/0007550 | A1 | * | 1/2014 | Martinsteg | ......... B01D 53/0407 55/485 |

(Continued)

FOREIGN PATENT DOCUMENTS

| | | |
|---|---|---|
| DE | 3806872 A1 | 9/1989 |
| DE | 3815850 A1 | 11/1989 |

(Continued)

OTHER PUBLICATIONS

Machine Translation of WO 9016071.*

*Primary Examiner* — Sharon M Davis
(74) *Attorney, Agent, or Firm* — Von Rohrscheidt Patents (57) ABSTRACT

The invention relates to a nuclear power plant including a containment vessel including a reactor pressure vessel for receiving fissionable nuclear fuel, an aerosol filter stage a pressure relief conduit through which a gas volume flow which is filtered in the aerosol filter stage is releasable to ambient through a pass through opening in the containment vessel, and an iodine filter stage through which the gas volume flow that is filtered in the aerosol filter stage is filterable before being released to the ambient, wherein the iodine filter stage is arranged within the containment vessel, characterized in that the aerosol filter stage and the iodine filter stage are connected with one another so that transferring the gas volume flow from the aerosol filter stage to the iodine filter stage is performed essentially at an identical pressure level.

20 Claims, 5 Drawing Sheets

(56) References Cited

U.S. PATENT DOCUMENTS

| | | | | |
|---|---|---|---|---|
| 2015/0110697 A1* | 4/2015 | Donabauer | ............. | B01J 20/04 |
| | | | | 423/240 R |
| 2016/0019987 A1* | 1/2016 | Eckardt | ................. | B01D 47/10 |
| | | | | 376/283 |
| 2017/0206986 A1* | 7/2017 | Cooper | .................... | G21F 9/02 |

FOREIGN PATENT DOCUMENTS

| | | | |
|---|---|---|---|
| DE | 102011056889 B3 | 3/2013 | |
| WO | WO 9016071 A1 * | 12/1990 | ............ G21C 9/004 |

* cited by examiner

NUCLEAR POWER PLANT

RELATED APPLICATIONS

This application claims priority from German patent application DE 10 2014 018 810.8, filed on Dec. 19, 2014 which is incorporated in its entirety by this reference.

INTRODUCTION

The invention relates to a nuclear power plant including:
a containment vessel including
a reactor pressure vessel for receiving fissionable nuclear fuel
an aerosol filter stage
a pressure relief conduit through which a gas volume flow which is filtered in the aerosol filter stage is releasable to the ambient through a pass through opening in the containment vessel, and
an iodine filter stage through which the gas volume flow that is filtered in the aerosol filter stage is filterable before being dispensed to the ambient, wherein the iodine filter stage is arranged within the containment vessel.

BACKGROUND OF THE INVENTION

When operating nuclear power plants an accident, like e.g. a coolant accident, can have an effect that sufficient heat output from the reactor core cannot be provided anymore. Lack of cooling can lead to overheating the reactor pressure vessel, also designated as reactor which can cause an evaporation of the cooling water from the primary cycle of the reactor and to a destruction of concrete in the reactor foundation. This generates large amounts of steam and non-condensing gases which lead to a pressure buildup in the containment vessel which encloses the reactor and the components of the primary cycle pressure tight.

It is known in the art that a pressurized-water reactor with a failure pressure of the containment vessel that is between 2.5 and 9 bar depending on its configuration reaches this failure pressure after 2-5 days when a core melt down has occurred. The atmosphere of the containment vessel then includes only fractions of the amount of radioactive aerosols originally generated by the core melt down due to decay processes occurring without additional external measures.

As a consequence of the accident in Chernobyl in the Soviet Union in 1986 all nuclear power plants in Germany were equipped with venting filters in order to prevent uncontrolled release of this radio activity through a sudden failure of the containment vessel and in order to further reduce the amount of released radioactivity. After the reactor accident in Fukushima in Japan in 2011 a retrofit of containment vessels of nuclear power plants with venting filters was commenced in Japan and also in other countries.

In particular for extreme conditions in the containment vessel prevailing after a core melt down, thus gas temperatures of up to 250° C. and pressures up to 9 bar a filter system was developed by the Kernforschungszentrum Karlsruhe, the so called dry filter method which helps to reduce environmental impacts through radioactive aerosols and gaseous radioactive iodine or organic iodine compounds by orders of magnitude.

The dry filter method is a completely passive system, typically including:
metal fleece filters of the aerosol filter for retaining airborne radioactive aerosols, and
specially doted molecular sieve absorbents for chemical absorption of gaseous radioactive iodine and its organic compounds.

During a core melt down the pressurized gas vapor mix of the containment vessel is only conducted into the venting chimney after passing a highly effective accident filter. The pressure relief prevents a failure of the containment vessel due to excessive pressure. The filter system protects the environment from airborne radioactive aerosols and iodine compounds.

DE 10 2011 056 889 B3 discloses an aerosol filter device for use in a pressure relief device of a nuclear power plant which aerosol filter device is characterized by increased heat transfer.

DE 38 15 850 A1 describes a method for a pressure relief of a nuclear power plant in which the relief flow is initially dehumidified by a metal fleece filter and aerosols are filtered and the relief gas flow is then expansion dried before the dried relief gas flow is brought into direct contact with the molecular sieve for iodine absorption filtering. The method known from DE 38 15 850 A1 addresses the problem that an accident provides high pressure and high humidity due to the water vapor, wherein the water vapor makes iodine absorption filtering with a molecular sieve impossible due to an agglomeration of water molecules in the molecular sieve (inhibition). Only a dried relief flow can be effectively routed through a molecular sieve.

Due to the high pressure that is provided in the containment vessel when an accident occurs (between 2 and 9 bar) drying the relief flow is typically performed by a throttle that is connected upstream of the iodine filter (also designated as pressure reduction orifice or expansion valve) only outside the containment vessel wherein the volume however is multiplied. Drying the relief gas flow outside the containment vessel has the following disadvantages:

On the one hand side multiplying the volume of the relief flow for drying requires filter devices that are sized accordingly and on the other hand side filtering the relief flow including radioactive aerosols and also gaseous radioactive iodine and its organic compounds is performed outside of the containment vessel, thus outside of a controlled area. This necessitates additional shielding measures for securing personnel and environment against radioactivity, in particular against radioactive isotopes of iodine and its organic compounds. Furthermore due to a high temperature difference between the relief flow and the filter device outside of the containment vessel there is a risk of condensation in the filter device wherein in particular radioactive residual condensate remains in the filter device which is arranged outside of the containment vessel.

According to an embodiment it is provided in DE 38 15 850 A1 or DE 38 06 872 A1 that the iodine filter stage is also arranged within the containment vessel in addition to the aerosol filter stage so that a majority of the disadvantages recited supra is overcome. In order to provide a sufficient degree of separation a throttle for pressure reduction is provided between the aerosol filter stage and iodine filter stage for pressure reduction, thus for expansion, so that a dew point spread is reached that is sufficiently large in order to secure the iodine sorption mechanism. However, in order to assure that there is a pressure differential between the iodine filter stage and the atmosphere outside of the containment vessel, it is mandatory for a pressure relief that another throttle is arranged in flow direction after the iodine filter stage, wherein the throttle provides a certain amount of pressure in the iodine filter stage. This second throttle has to be adaptable to the individually provided pressure conditions and requires a control unit. It is furthermore required that the housing of the iodine filter stage is configured very stable in order to be able to stand up to the pressure differential between the outer portion of the iodine filter stage, thus within the containment vessel and the inner portion of the iodine filter stage in case of an accident.

BRIEF SUMMARY OF THE INVENTION

Thus, it is an object of the present invention to improve a nuclear power plant of the type described supra so that the recited disadvantages are overcome.

The object is achieved in that the aerosol filter stage and the iodine filter stage are connected with one another so that transferring the gas volume flow starting from the aerosol filter stage into the iodine filter stage is essentially performed on the same pressure level. The limitation "essentially the same" pressure level comes from the fact that certain pressure loses can be occur based on the system, like e.g. natural pressure loses over the length of the tubular conduit. According to the instant application a possible pressure deviation between the aerosol filter stage and the iodine filter stage is only below 200 mbar.

According to the invention expansion drying upstream of the iodine filter stage is omitted, this means there is no expansion valve between the aerosol filter stage and the iodine filter stage. For this reason furthermore an additional controllable throttle for maintaining a particular minimum pressure which is typically arranged in flow direction of the gas volume flow behind the iodine filter stage can be omitted. According to the invention generally no expansion valve is arranged in the entire pressure relief conduit. Consequently the iodine filter stage operates in a high pressure range in case of an accident, this means that approximately the same pressure is provided in the iodine filter stage that is provided in the containment vessel. It is self evident that starting from an interior of the containment vessel and flowing through the aerosol filter stage and the iodine filter stage, connecting tubular conduits and the pressure relief conduit a certain pressure drop is provided which facilitates exhausting the gas volume flow into the ambient. Before the relief flow is dispensed to the ambient it can be conducted from the pressure relief conduit into a smoke stack or initially into an air exhaust channel which in turn leads into a smoke stack. Alternatively the pressure relief conduit can also lead directly into the ambient.

Due to the fact that the iodine filter stage according to the present invention is used in the high pressure range the long term prejudice in the art is overcome that an adsorbent used in the iodine filter stage only works reliably when a dew point spread is provided, this means when the gas volume flow to be filtered is dried by expansion. In this respect there was a rule that the degree of precipitation increases when the dew point spread also increases. Tests performed by the applicant, however, have surprisingly shown that also a dew point spread of approximately 0 K facilitates a sufficient degree of precipitation with the adsorbents that are currently in use. It has rather become evident that the adsorbent also functions correctly under high humidity or under dew point conditions (there is condensation) so that an expansion of the relief flow between the aerosol filter stage and the iodine filter stage can be omitted.

Omitting an expansion valve upstream of the iodine filter stage viewed in flow direction of the gas volume flow to be filtered has the following advantages. The iodine filter stage is used in analogy to the aerosol filter stage at a prevailing pressure over atmosphere of up to 10 bar which has the consequence that contrary to the conventionally used iodine filter stages a small gas volume flow is fed which is almost proportional to the pressure. Due to the significantly lower gas volume flow to be filtered the iodine filter stage can be configured significantly smaller which becomes relevant in particular in view of the space constraints within the containment vessel. Thus, also flexibility is obtained with respect to a possible installation location and much better handling properties for installing the iodine filter stage. Another advantage is that a sufficient pressure drop is always provided which is mandatory for the passive venting system.

Also with respect to the tubular conduits conducting the gas volume flow the lower gas volume flow is advantageous since the conduits can accordingly have lower tube diameters. This means in turn that freedom is gained for routing the conduits because they require significantly less installation space. It is also guaranteed by omitting expansion drying in front of the iodine filter stage that even for tubular conduits with a length of several hundred meters and a pressure drop associated therewith a sufficient pressure drop for conveying the gas volume flow remains in the pressure relief conduit. Thus, this is an absolutely passive filter system and no additional energy is required.

Due to the fact that the same pressure is provided in the aerosol filter stage and also in the iodine filter stage as in the containment vessel the filter housings can be configured according to a simple standard with respect to their strength.

A variant for configuring a connection between the aerosol filter stage and the iodine filter stage can be provided as a tubular conduit which leads from the aerosol filter stage to the iodine filter stage. Thus, the tubular conduit includes in particular no devices for throttling the gas volume flow like for example an expansion valve.

Another alternative for connecting the aerosol filter stage and the iodine filter stage can be provided according to an embodiment of the invention in that the aerosol filter stage and the iodine filter stage are arranged within the same filter housing so that a combined aerosol-iodine filter unit is provided. Thus, the two filter stages can be combined into a compact unit. This removes the requirement to connect the aerosol filter stage by accordingly tight and strong conduits with a separately configured iodine filter stage. However, space in the containment vessel can be so limited that a separate configuration of the two filter stages is preferred.

With respect to a compact configuration of the combined aerosol-iodine filter unit and a continuous and even flow through it can be advantageous when an outlet cross section of the aerosol filter stage corresponds to an inlet cross section of the iodine filter stage.

Due to the small space requirement for the iodine filter stage when the aerosol filter stage and the iodine filter stage are arranged within the same filter housing so that a combined aerosol-iodine filter unit is provided a depth in flow direction of the combined aerosol-iodine filter unit can be between 1,400 mm and 2,000 mm and a height that typically extends vertically of the combined aerosol-iodine filter unit can be between 2500 and 2900 mm. A combined aerosol-iodine filter stage is characterized by a compact configuration and is in particular installable well and in a flexible manner within the space constraints of a nuclear power plant. Conventional combined aerosol-iodine filter stages which are only known outside of the containment vessel have a depth in flow direction of 9 m at a filter width of approximately 1.50 m and a height of approximately 3.70 m or more.

A particularly advantageous embodiment of the nuclear power plant according to the invention provides that the iodine filter stage chemically adsorbs iodine and/or at least an organic iodine compound, in particular iodomethane wherein the adsorbable iodine and/or the at least one organic iodine compound can be radio-active.

Thus, it is furthermore advantageous when the iodine filter stage includes a zeolith material as an adsorbent, wherein the zeolith is advantageously hydrophobic. For a hydrophobic zeolith material an organic crystalline tectosilicate can be used which has three dimensional grid structures made from $SiO_4$ and $AlO_4$ tetrahedrons. Zeoliths are characterized by their open structure, wherein $SiO_4$ and $AlO_4$ encloses large cavities which are connected with one another by channels (pores) with a uniform precisely defined diameter.

The zeolite material can be doted with silver so that the iodine to be precipitated is chemically adsorbed by the silver (chemical sorption) which is bonded in the zeolite structure. In order to prevent possible catalytic reactions caused by media including $H_2$ an advantageously configured zeolite material can have respective chemical properties (inhibitor). The described zeolite material is characterized by its extremely hydrophobic properties and temperature resistance so that this zeolite material facilitates applications in a steam saturated atmosphere that can be provided in a containment vessel.

With respect to retrofitting existing power plants it is particularly advantageous when the aerosol filter stage, the iodine filter stage and/or the combined aerosol-iodine filter unit is assembled from at least two modules that are connectable with one another fluid tight since preexisting locks typically only have intentionally small dimensions. It is thus most useful when individual filters that are provided with an enveloping partial housing are provided at least at one side with a circumferential flange through which adjoining partial housings can be connected. It is appreciated that a filter stage or a filter unit can be assembled from three, four, five or more modules in particular when the filter stage includes plural filters connected in series.

Independently from a separate or combined configuration of the filter stages it has proven very advantageous when an outlet surface of an aerosol filter stage has a distance from an inlet surface of an iodine filter stage which is smaller than 260 mm, advantageously smaller than 250 mm further advantageously smaller than 240 mm. It is particularly advantageous that heat captured in the aerosol filter stage heats the adjacent iodine filter stage and thus has a drying effect. This influences a degree of precipitation of the iodine filter stage in a positive manner. Accordingly a heater for the iodine filter stage can be omitted which is particularly desirable for a passive and thus non failure prone system.

As stated supra dimensions of the iodine filter stage can be drastically reduced based on the arrangement of the iodine filter stage stipulated according to the invention. It is even possible to provide an iodine filter stage in which a bed depth of the adsorbent is less than 80 mm, advantageously less than 60 mm, further advantageously less than 50 mm.

Furthermore the invention also relates to a method for providing pressure relief to a containment vessel of a nuclear power plant in which a gas volume flow is initially run through an aerosol filter stage and subsequently through an iodine filter stage before the filtered gas volume flow is passed into the ambient through a pressure relief conduit, wherein the aerosol filter stage and also the iodine filter stage are arranged within a containment vessel including a reactor pressure vessel. According to the invention the gas volume flow is transferred from the aerosol filter stage into the iodine filter stage so that the nuclear power plant has the advantages described supra.

According to an advantageous embodiment of the method that is provided that the gas volume flow is conducted from the aerosol filter stage directly into the iodine filter stage so that the iodine filter stage is continuously dried by heat generated in the aerosol filter stage. As stated supra this improves the degree of precipitation of the adsorbent. The term "directly" shall be interpreted according to the patent claim so that the aerosol filter stage and the iodine filter stage are flowed through closely adjacent to one another, this means that a tubular conduit arranged there between is configured very short. Advantageously it is provided that an outlet cross section of the aerosol filter stage and an inlet cross section of the iodine filter stage are arranged within a common housing and a tubular conduit between the two stages can be omitted. A distance between the aerosol filter stage and the iodine filter stage should be advantageously between 240 mm and 260 mm in order to provide optimum heat transfer.

BRIEF DESCRIPTION OF THE DRAWINGS

The invention is now described in more detail based on embodiments of a nuclear power plant with reference to drawing figures, wherein.

DETAILED DESCRIPTION OF THE INVENTION

Figure 1:
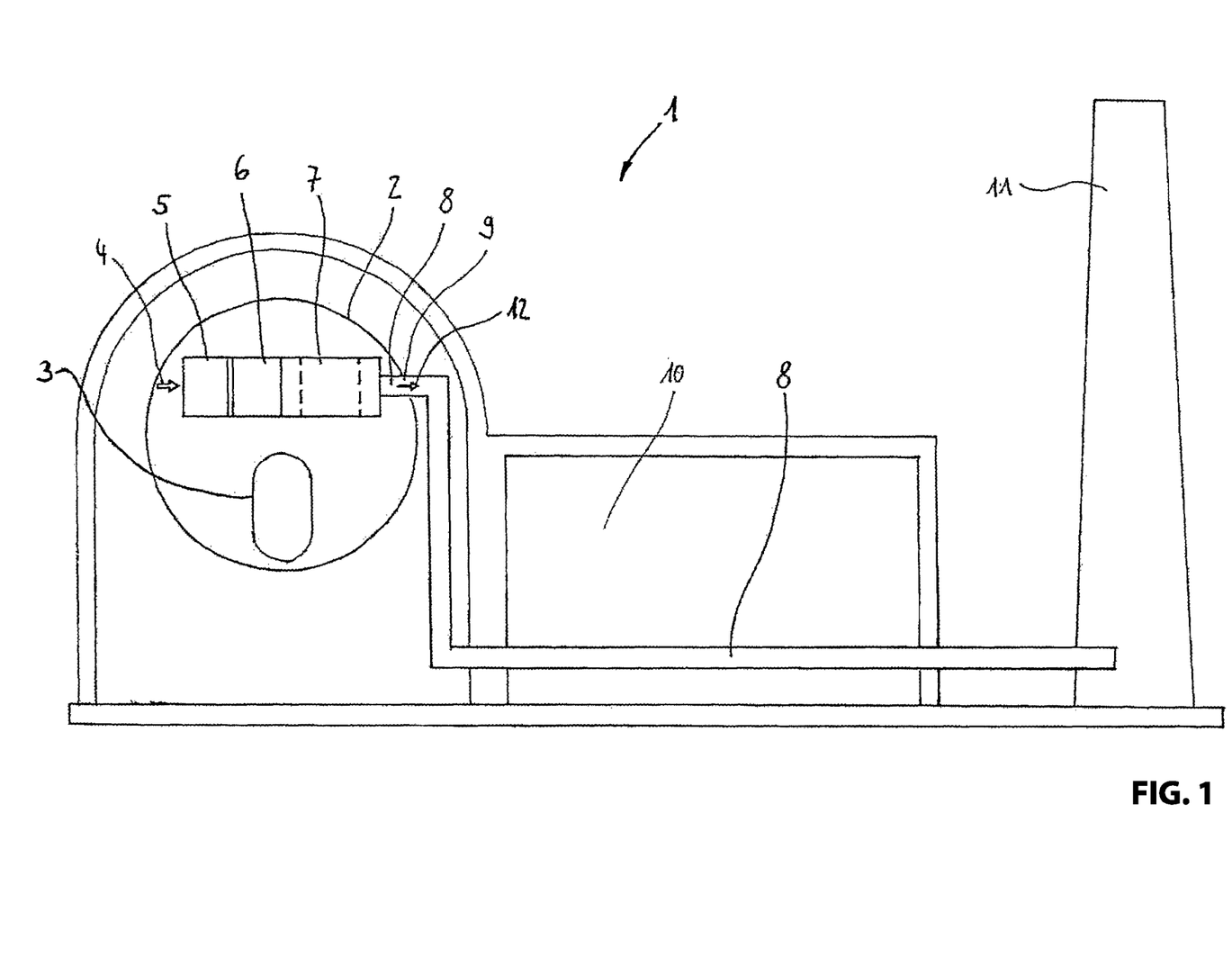
FIG. 1 illustrates a schematic view of the nuclear power plant according to the invention.

FIG. 1 depicts a schematic view of a nuclear power plant 1 according to the invention including a containment vessel 2 in which a reactor pressure vessel 3 is arranged for receiving a fissionable nuclear fuel that is not illustrated in the drawing figure. In view of a possible accident where a pressure build up in the containment vessel 2 requires pressure relief an aerosol pre filter stage 5, an aerosol filter stage 6 and an iodine filter stage 7 are arranged in the containment vessel 2 for filtering a gas volume flow (arrow 4) coming out of the nuclear power plant 1 wherein the filter stages are connected in series. The three filter stages 5, 6, 7 can be arranged at separate locations and can be connected with one another through respective conduits that are not illustrated in the drawing figure but they can also be combined to form a compact filter unit. By the same token only two of the three filter stages can be combined to form a unit.

Starting from the iodine filter stage 7 a pressure relief conduit 8 leads through a pass through opening 9 in the containment vessel 2 and through an addition 10 of the nuclear power plant 1 into a smoke stack 11 through which the filtered relief flow which is indicated by an arrow 12 is released into the environment. The pressure relief conduit 8 thus leads out of the entire safety area of the nuclear power plant 1 and terminates in the smoke stack 11. Alternatively an additional air relief channel can be arranged at a transition between the pressure relief conduit 8 and the smoke stack 11 so that the relief flow is conducted starting from the pressure relief conduit through the air relief channel into the smoke stack. Furthermore alternatively the smoke stack 11 and also the air relief channel can be omitted so that the pressure relief conduit terminates in the ambient.

Figure 2:
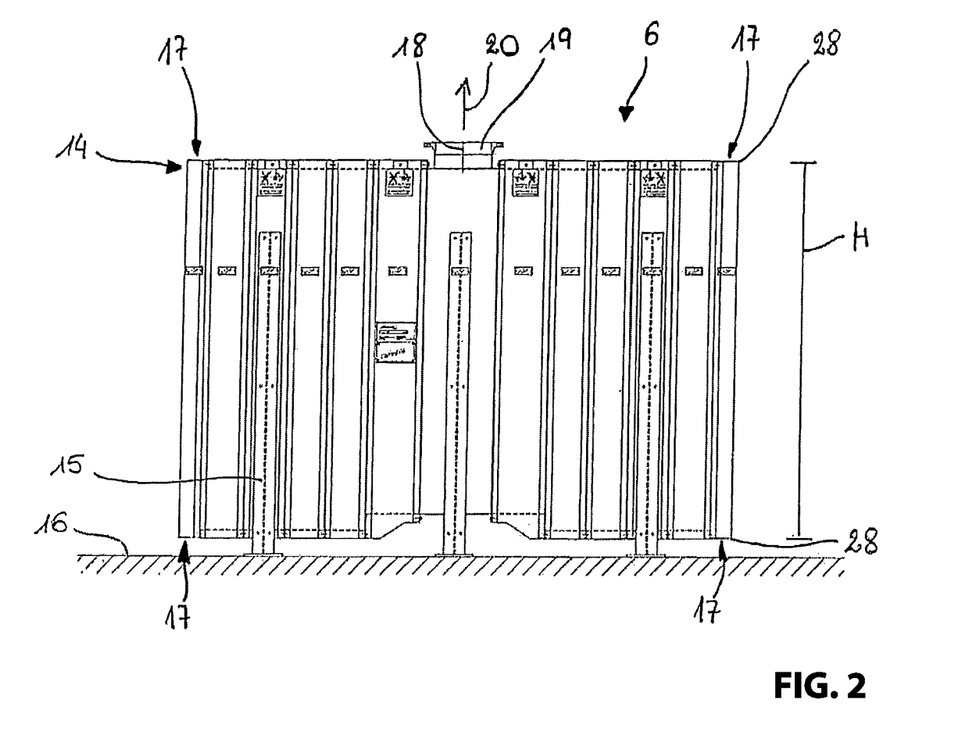
FIG. 2 illustrates a view of the aerosol filter stage according to FIG. 1.

FIG. 2 illustrates an advantageous embodiment for the aerosol filter stage 6 of the nuclear power plant 1 according to the invention in a view where the aerosol filter stage 6 is configured as a unit that is separate from the iodine filter stage 7. The aerosol filter stage 6 has an almost square housing with a rectangular cross section wherein the housing 14 is supported by 6 supports 15, on a base 16. The aerosol filter stage 6 has a mirror symmetrical configuration so that a gas volume flow that is to be filtered which is indicated in the figures with arrows 17 respectively flows from two opposite sides respectively from above and from below into the aerosol filter stage 6 and exits the aerosol filter stage 6 through an outlet 19 arranged on a center axis 18 of the aerosol filter stage 6 at a top side of the housing 14, wherein the volume flow exiting the aerosol filter stage 6 is indicated by another arrow 20.

Figure 3:
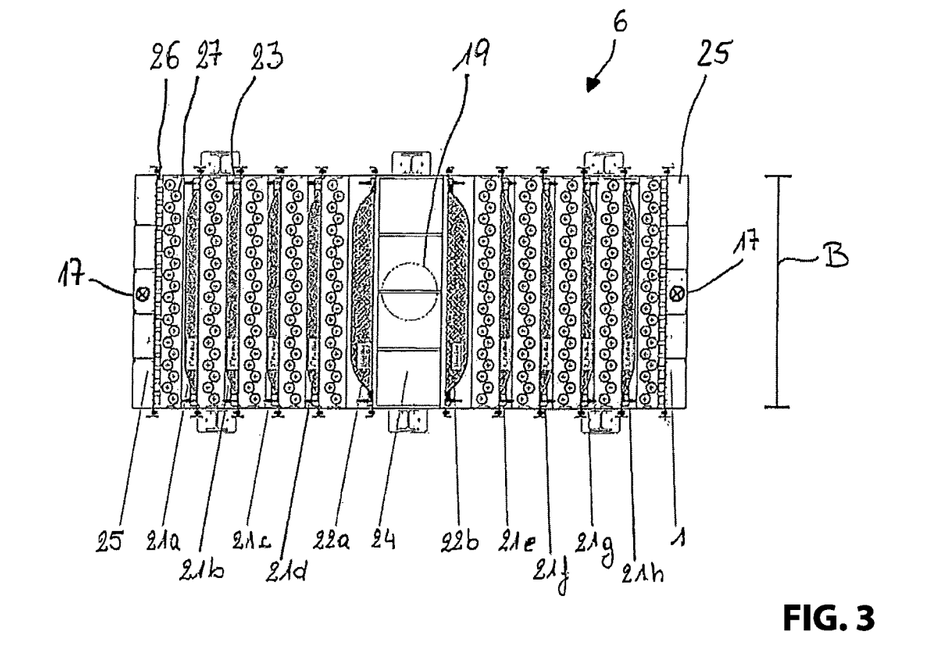
FIG. 3 illustrates a horizontal sectional view of the aerosol filter stage according to FIG. 2.

In FIG. 3 which illustrates a horizontal sectional view of the the aerosol filter stage 6 according to FIG. 2 it is evident that ten filter elements 21a, 21b, 21c, 21d, 21e, 21f, 21g, 21h, 22a, 22b are arranged in the housing 14 in parallel and at a distance from one another, wherein the filter elements are respectively circumferentially supported in a sealing manner at circumferentially arranged consoles of the housing 14 so that they respectively close the cross section of the housing 14. A precise support of the filter elements 21, 22 at the consoles 23 can be performed in a conventional and known manner which does not need to be described in more detail. The filter elements 21, 22 have a sickle shaped cross section so that they have lower thickness along the consoles 23, whereas they are configured thicker in a center.

In the center of the housing 14, this means between the fifth and the sixth filter element 22a, b there is a clean gas collector 24 which extends approximately over a width B of approximately 400 mm and a height H of approximately 2700 mm to approximately 2900 mm of the housing 14 and which is provided on the top side with the outlet 19.

The two inlet cross sections of the aerosol filter stage 6 are respectively provided with a pre chamber 25 into which the gas volume flow to be filtered (arrow 17 points into the drawing plane) can flow on both sides from above and also from below. This way it is prevented that open flames in the interior cavity of the safety container 2 reach into the aerosol filter stage 6. Downstream of the pre chamber 25 in flow direction support elements 26 configured as C-profiles are arranged that extend over the height of the housing 14, from which C-profiles the volume flow to be filtered can only flow through open top sides and bottom sides of the C-profiles and through gaps between the C-profiles and the housing 14 into the filter elements 21, 22.

Accordingly the gas volume flow flows from the safety container 2 initially into the pre chamber 25 then through openings into the support elements 26 and eventually through the filter elements 21, 22 into the clean gas collector 24.

Since the aerosol filter stage 6 is configured mirror symmetrical the gas volume flow to be filtered (arrow 17) passes five filter elements 21a, 21b, 21c, 21d, 22a or 22b 21e, 21f, 21g, 21h before it reaches the clean gas collector 24. The first four filter elements 21 in flow direction are configured as pre filters, whereas the filter elements 22 that are oriented towards the clean gas collector 24 are respectively operated as main filters.

In flow direction of the volume flow there is a row of tubular elements 27 with a circular cross section in front of each filter element 21, 22 wherein the tubular elements extend vertically and penetrate the housing 14 in an upper and in a lower lateral surface 28 so that the inner space of the tubular elements is in contact with ambient air. When the aerosol filter stage 6 is operated heat that is generated in the aerosol filter stage 6 also heats ambient air in the tubular elements 27 which creates natural convection which is used for cooling the aerosol filter stage 6.

Figure 4:
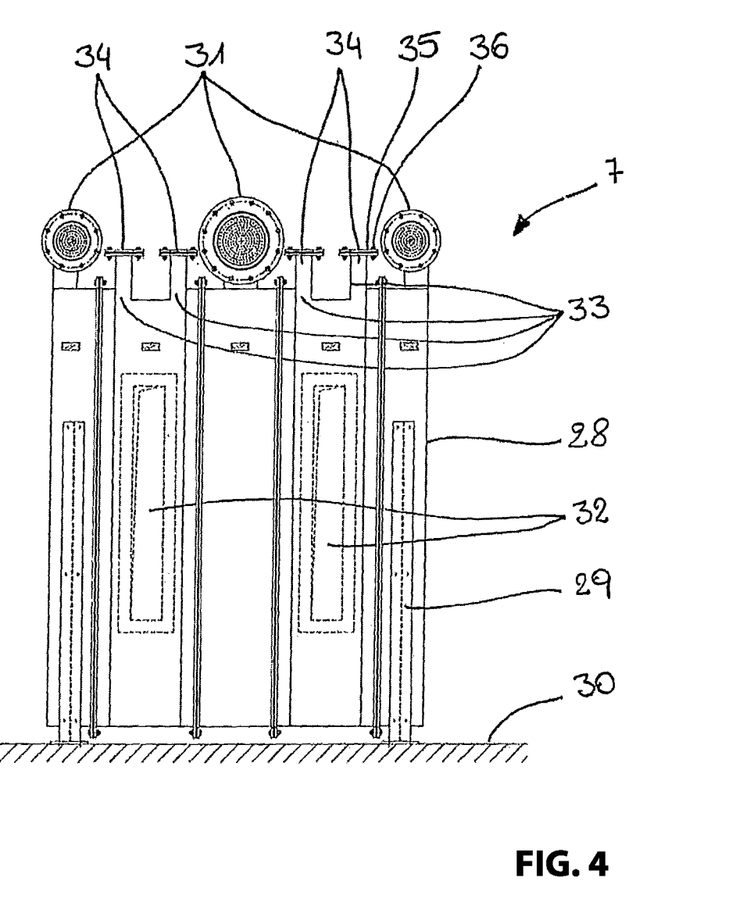
FIG. 4 illustrates a view of the iodine filter stage of FIG. 1.

FIG. 4 illustrates a view of the iodine filter stage 7 of the nuclear power plant 1 according to the invention illustrated in FIG. 1, wherein the iodine filter stage 7 has a cuboid housing 28 similar to the aerosol filter stage 6 of FIG. 2 and is attached by four supports 29 at a base 30. Three connection spouts 31 are arranged at a top side of the housing 28 wherein the volume flow to be filtered flows into the iodine filter stage 7 through the three connection spouts. Due to the fact that the iodine filter stage 7 is configured as a separate unit the volume flow exiting the aerosol filter stage 6 is conducted into the iodine filter stage 7 through respective conduits that are not illustrated in the figures and which connect with the connecting spouts 31 of the iodine filter stage 7. The filtered volume flow exits the iodine filter stage 7 through two rectangular outlet openings 32 at which pressure relief conduits are connected which are not illustrated in the drawing figure.

In the embodiment the iodine filter stage 7 includes four beds 33 which are filled with poured iodine sorption material, wherein the beds 33 are respectively filled through filling openings 34 arranged at a top side of the beds 33, wherein the filling openings extends over the entire width B1 of the iodine filter stage 7. The filling openings 34 have a circumferential flange on which a cover plate 35 is arranged in a sealing manner with respective bolts 36.

Figure 5:
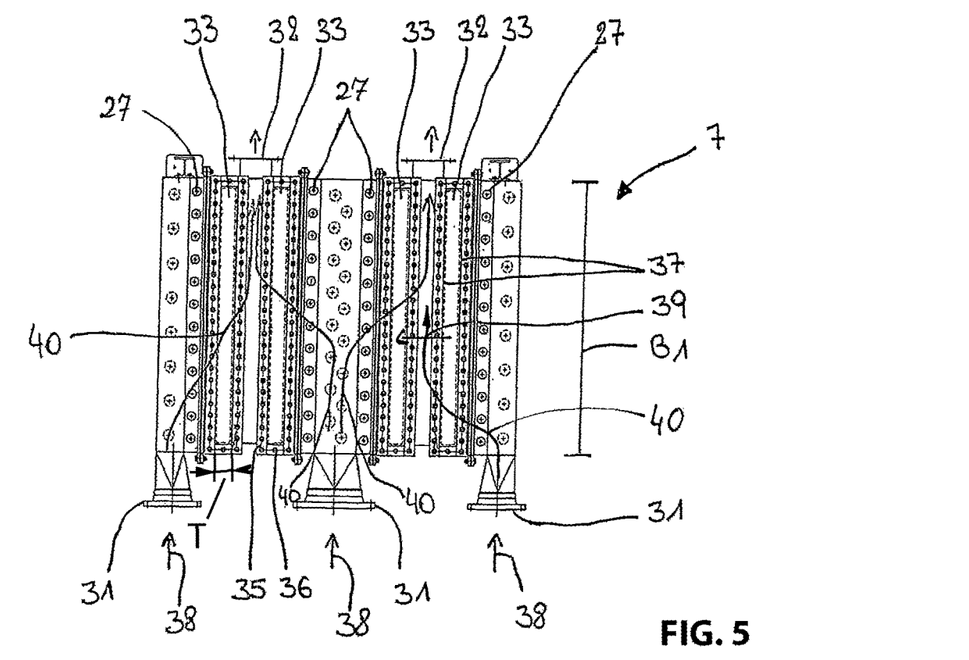
FIG. 5 illustrates a horizontal sectional view of the iodine filter stage according to FIG. 4.

From FIG. 5 which illustrates a horizontal sectional view through the iodine filter stage 7 of FIG. 4 it is evident that the beds 33 for the iodine sorption material are assembled from sheet metal plates wherein lateral sheet metal plates 37 that extend perpendicular to a main flow through direction (arrow 39) are configured as perforated plates, so that the gas volume flow to be filtered which is indicated by arrows 38 can pass through the iodine sorption material. The entire hole pattern of the perforated sheet metal plates is thus adapted to the sieve line of the iodine sorption material so that the smallest elements cannot pass through the holes of the lateral plates 37. The bed depth T according to the embodiment of the iodine filter stage 7 illustrated herein is 40 mm with a flow through surface of approximately 2 m². However, also other dimensions are feasible.

It is evident that the gas volume flow to be filtered which has an orientation corresponding to the arrows 38 after its entry into the iodine filter stage 7 is initially deflected by approximately 90° after its entry through the connection spouts 31 into the iodine filter stage 7 so that it passes the iodine filter material and is then deflected by approximately 90° again so that it exits the iodine filter stage 7 through the outlet openings 32. Though the main flow through direction of the gas volume flow through the iodine filter stage 7 which is indicated by the arrow 39 is perpendicular to the flow direction upon induction of the gas volume flow (arrow 38), however an actual pattern of the gas volume flow will be established which is approximately S shaped according to the line 40.

In analogy to the aerosol filter stage 6 of FIG. 2 also the iodine filter stage 7 has tubular elements 27 for cooling the iodine filter stage 7 during operations. The tubular elements 27 are respectively arranged in flow through direction (line 40) upstream of the beds and distributed over the width B1.

Figure 6:
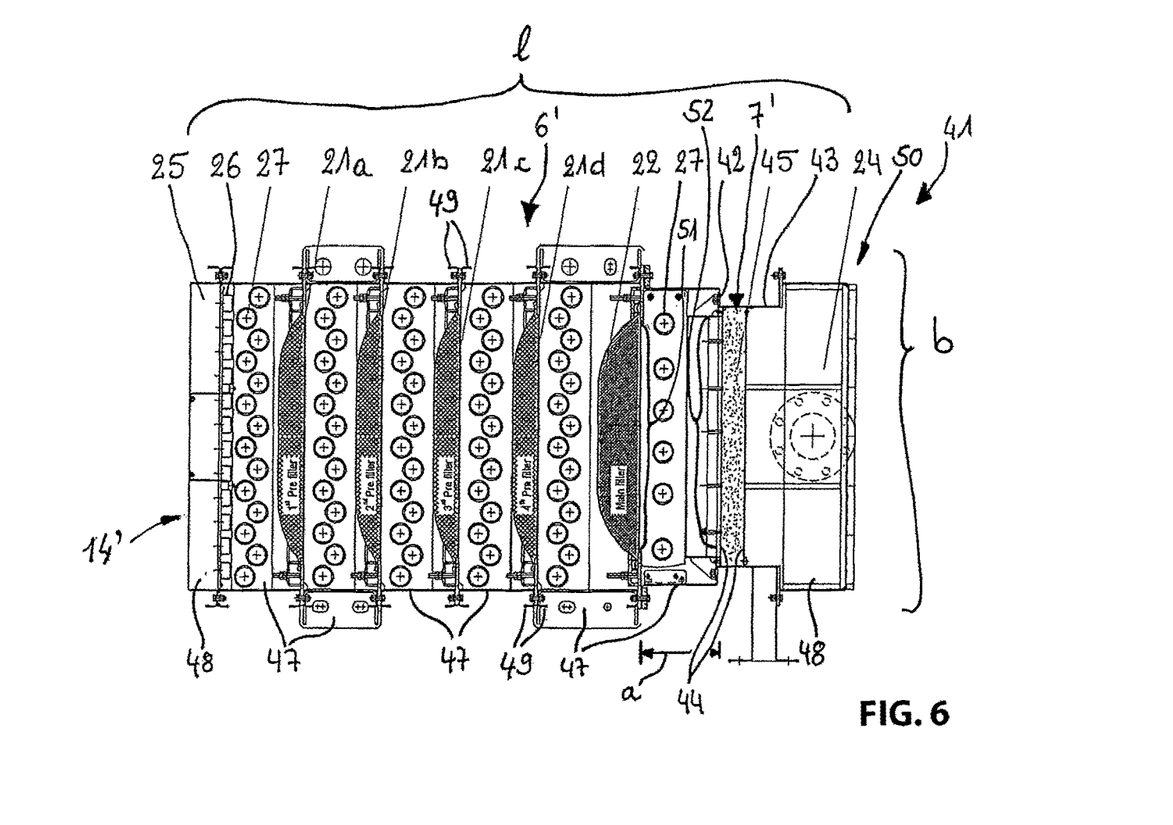
FIG. 6 illustrates a horizontal sectional view of an alternative aerosol filter stage according to the invention with an integrated iodine filter stage.

FIG. 6 illustrates a horizontal sectional view through a combined aerosol and iodine filter unit 41 in which an iodine filter stage 7' is arranged between the aerosol filter stage 6' and the clean gas collector 24. Though FIG. 6 only illustrates an aerosol filter stage 6' with only five filter elements 21, 22 at which the iodine filter stage 7' and the clean gas collector 24 are connected, it is also feasible to arrange another iodine filter stage 7 and another aerosol filter stage 6 at another side of the clean gas collector 24 so that a mirror symmetrical configuration is provided in analogy to the aerosol filter stage 6 according to FIG. 3, wherein the mirror symmetrical configuration includes ten filter elements, two iodine filter stages and 1 clean gas collector. It is certainly feasible to select a different number of filter elements or iodine filter stages as a function of individual requirements of the nuclear power plant 1. The basic configuration of the aerosol filter stage 6' coincides with the configuration of the aerosol filter stage 6 according to FIG. 3 with a pre chamber 25, support elements 26, tubular elements 27 and filter stages 21, 22. A row of tubular elements is also arranged for cooling purposes between the main filter 22 of the aerosol filter stage 6' according to FIG. 6 and the iodine filter stage 7'.

The housing 14' of the aerosol filter stage 6' includes an elbow 42 on a side oriented towards the iodine filter stage 7' at both longitudinal sides, wherein a respective U-shaped folded piece of sheet metal 43 is arranged at the elbow 42 wherein the iodine filter stage 7' is attached at the piece of sheet metal 43 wherein the iodine filter stage 7' is essentially provided from two perforated sheet metal plates 44 arranged at the sheet metal plates 43 and poured iodine sorption material arranged there between. The connections are respectively provided gas tight so that the gas volume flow to be filtered or the filtered gas volume flow can only flow into the clean gas connector 24 so that it can exit the nuclear power plant 1 in a controlled manner through the pressure relief conduit 8 connected at the clean gas collector 24. The combined aerosol-iodine filter unit 41 has a joint filter housing 50 so that it can be transported and set up as a unit. It is furthermore evident that the aerosol-iodine filter unit 41 is assembled from eight modules 47, 48, wherein all modules 47 in addition to the edge modules 48 are provided with a circumferential flange 49 on both sides. The edge modules 48 are only provided with a circumferential flange 49 on a side oriented towards a module 47. Due to the modular configuration the illustrated combined aerosol-iodine filter unit 41 is suitable in particular for retrofitting a nuclear power plant since the modules 47, 48 have small dimensions and can thus be introduced into the containment vessel through exiting locks in the nuclear power plant.

An outlet surface 51 of the gas volume flow from the main filter 22 corresponds in FIG. 6 substantially to an inlet surface 52 into the iodine filter stage 7'.

Figure 7:
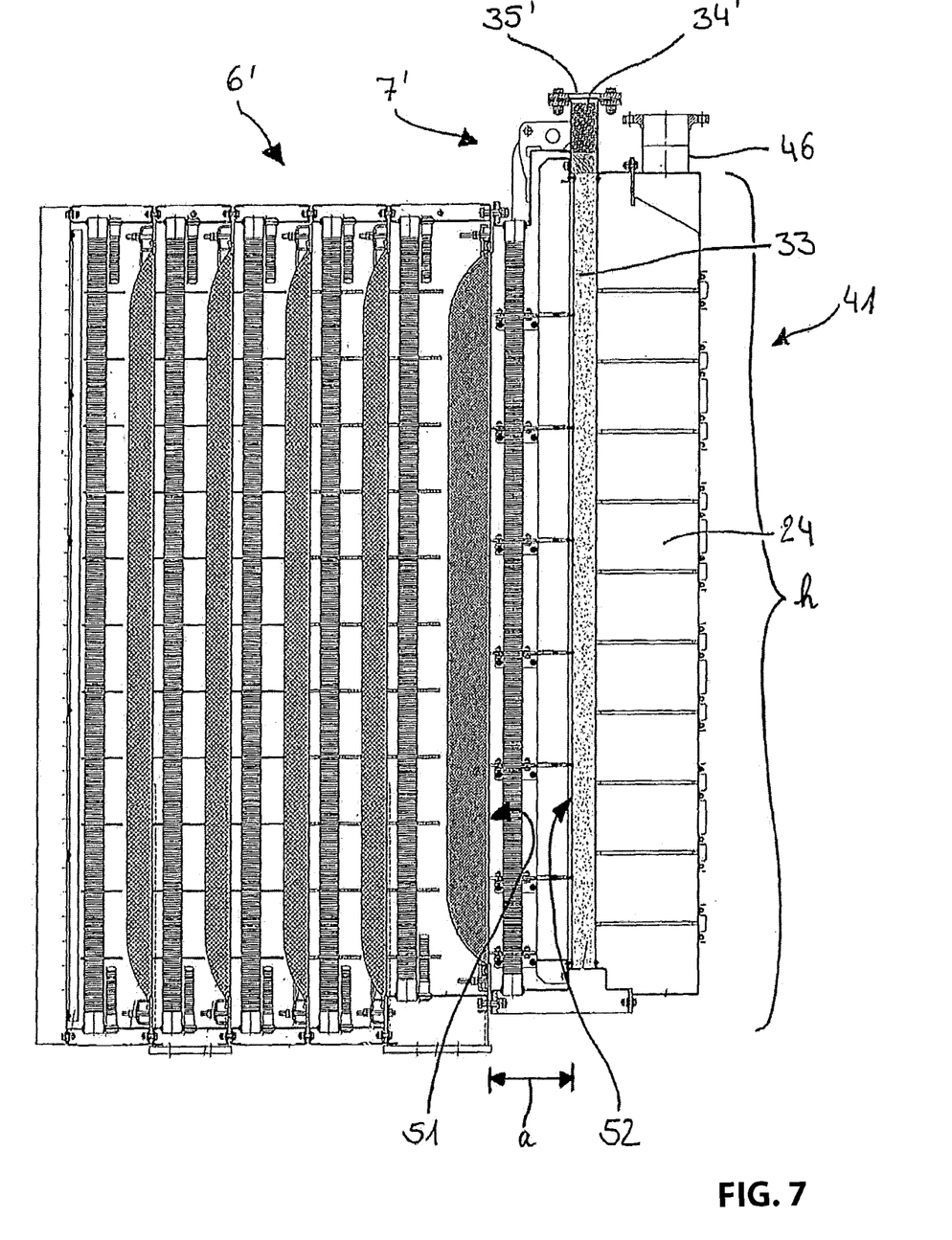
FIG. 7 illustrates a vertical sectional view of the aerosol filter stage according to FIG. 6.

In the vertical sectional view of the combined aerosol-iodine filter unit 41 which is illustrated in FIG. 7 it is apparent that the iodine filter stage 7' protrudes at its top side beyond the aerosol filter stage 6', wherein the iodine filter stage 7' has a fill in opening 34' with a circumferential flange at its top side wherein filling the bed 33' is performed through the fill in opening. After filling the bed 33 the fill in opening 34' is closed tight with a cover plate 35'.

Furthermore FIG. 7 illustrates a connection spout 46 at the clean gas connector 24 wherein the non illustrated pressure relief conduit 8 connects to the clean gas connector. The combined aerosol-iodine filter unit illustrated in FIGS. 6 and 7 has a length l of approximately 1500 mm and a height h of approximately 2700 mm and a width b of approximately 1500 mm. The height of the inlet surface 52 into the iodine filter stage is greater than the outlet surface 51 of the gas volume flow from the main filter 22. A distance a between the outlet surface 51 and the inlet surface 52 is approximately 250 mm in FIG. 7.

REFERENCE NUMERALS AND DESIGNATIONS 1 nuclear power plant
2 containment vessel
3 reactor vessel
4 arrow (gas volume flow to be filtered)
5 aerosol pre filter stage
6, 6' aerosol filter stage
7, 7' iodine filter stage
8 pressure relief conduit
9 pass through opening
10 addition
11 smoke stack
12 arrow
14, 14' housing
15 support
16 base
17 arrow
18 center axis
19 outlet
20 arrow
21 filter element
22 filter element
23 console
24 clean gas collector
25 pre chamber
26 support elements
27 tubular element
28, 28' housing
29 support
30 base
31 connection spout
32 outlet openings
33, 33' bed
34, 34' fill in openings
35, 35' cover plate
36 bolt
37 side plate
38 arrow
39 arrow
40 line
41 aerosol-iodine filter unit
42 elbow
43 sheet metal plate
44 perforated plate
45 poured material
46 connection spout
47 module
48 edge module
49 flange
50 common filter housing
51 outlet surface 52 inlet surface
B width
H height 1, width iodine filter stage
T bed depth
l length
h height
b width
a distance

What is claimed is:

1. A nuclear power plant, comprising:
   a containment vessel including
   a reactor pressure vessel for receiving fissionable nuclear fuel,
   an aerosol pre filter stage,
   an aerosol filter stage,
   an iodine filter stage, and
   a pressure relief conduit through which a gas volume flow which is filtered in the aerosol filter stage and the iodine filter stage is releasable to ambient through a pass through opening in the containment vessel,
   wherein the iodine filter stage is arranged within the containment vessel,
   wherein the gas volume flows through aerosol pre filter stage, then the aerosol filter stage then the iodine filter stage before being released to the ambient through the pass through opening in the containment vessel,
   wherein the gas volume flows between and through the aerosol pre filter stage, the aerosol filter stage and the iodine filter stage in a horizontal direction, and
   wherein the aerosol filter stage and the iodine filter stage are connected with one another so that transferring the gas volume flow from the aerosol filter stage to the iodine filter stage is performed passively.

2. The nuclear power plant according to claim 1, wherein the aerosol filter stage and the iodine filter stage are arranged within a filter housing so that a combined aerosol-iodine filter unit is provided.

3. The nuclear power plant according to claim 2, wherein an outlet cross section of the aerosol filter stage is equal to an inlet cross section of the iodine filter stage.

4. The nuclear power plant according to claim 2,
   wherein a depth in a flow direction of the combined aerosol-iodine filter unit is between 1400 mm and 2000 mm, and
   wherein a height perpendicular to the flow direction of the combined aerosol-iodine filter unit is between 2500 mm and 2900 mm.

5. The nuclear power plant according to claim 1,
   wherein the iodine filter stage chemically adsorbs iodine or at least one organic iodine compound, and
   wherein the adsorbable iodine or the at least one organic iodine compound can be radio-active.

6. The nuclear power plant according to claim 5,
   wherein the iodine filter stage includes a zeolith material as an adsorbent, and
   wherein the zeolith material is hydrophobic.

7. The nuclear power plant according to claim 1, wherein an outlet surface of the aerosol filter stage has a distance from an inlet surface of the iodine filter stage of less than 260 mm.

8. The nuclear power plant according to claim 1, wherein a bed depth of the adsorbent is less than 80 mm.

9. The nuclear power plant according to claim 1,
   wherein the iodine filter stage chemically adsorbs iodine and at least one organic iodine compound, and
   wherein the adsorbable iodine and the at least one organic iodine compound can be radio-active.

10. The nuclear power plant according to claim 9, wherein the at least one organic compound is iodomethane.

11. The nuclear power plant according to claim 9, wherein there is no expansion valve between the aerosol filter stage and the iodine filter stage.

12. The nuclear power plant according to claim 1, wherein there is no expansion valve between the aerosol filter stage and the iodine filter stage.

13. The nuclear power plant according to claim 1, wherein beds for the iodine sorption material are formed by perforated vertical sheet metal plates so that the gas volume flows in the horizontal direction through perforations of the perforated vertical sheet metal plates.

14. The nuclear power plant according to claim 1, wherein a pressure difference between the aerosol filter stage and the iodine filter stage is below 200 mbar.

15. The nuclear power plant according to claim 1, wherein a dew point spread in the iodine filter stage is zero or negative.

16. A method for providing pressure relief for a containment vessel of a nuclear power plant, comprising the steps:
    running a gas volume flow initially through an aerosol pre filter stage, thereafter through an aerosol filter stage and subsequently through an iodine filter stage before
    releasing a filtered gas volume flow through a pressure release conduit to an ambient,
    wherein the aerosol filter stage and the iodine filter stage are arranged within the containment including a reactor pressure vessel,
    wherein the gas volume flows between and through the aerosol pre filter stage, the aerosol filter stage and the iodine filter stage in a horizontal direction, and
    wherein in that the gas volume flow is run from the aerosol filter stage into the iodine filter stage so that the gas volume flow remains substantially constant.

17. The method according to claim 16, wherein the gas volume flow is introduced from the aerosol filter stage directly into the iodine filter stage so that the iodine filter stage is continuously dried by a heat generated in the aerosol filter stage.

18. The method according to claim 16, wherein the aerosol filter stage and the iodine filter stage are connected with one another so that transferring the gas volume flow from the aerosol filter stage to the iodine filter stage is performed passively.

19. The method according to claim 16, wherein beds for the iodine sorption material are formed by perforated vertical sheet metal plates so that the gas volume flows in the horizontal direction through perforations of the perforated vertical sheet metal plates.

20. The method according to claim 16, wherein a pressure difference between the aerosol filter stage and the iodine filter stage is below 200 mbar.

* * * * *